(No Model.)

L. C. TIFFANY.
Colored Glass Window.

No. 237,418.                    Patented Feb. 8, 1881.

Witnesses:
James H. Hunter
Elwyn S. Mailler

Inventor:
Louis C. Tiffany

UNITED STATES PATENT OFFICE.

LOUIS C. TIFFANY, OF NEW YORK, N. Y.

COLORED-GLASS WINDOW.

SPECIFICATION forming part of Letters Patent No. 237,418, dated February 8, 1881.

Application filed October 25, 1880. (No model.)

*To all whom it may concern:*

Be it known that I, LOUIS C. TIFFANY, a citizen of the United States, residing in the city, county, and State of New York, have invented new and useful Improvements in Colored-Glass Windows, of which the following is a specification.

This invention relates to the introduction of a new character of glass in colored-glass windows.

The improvement consists in a metallic luster being given to one surface of pieces of glass and the insertion of such glass among other pieces of colored glass in a window or mosaic. The effect is a highly-iridescent one and of pleasing metallic luster, changeable from one to the other, depending upon the direction of the visual ray and the brilliancy or dullness of the light falling upon or passing through the glass. This is the case either when such combination of glass is as a transparency or permanently in a window or in a reflective mosaic—that is to say, with a mosaic containing a reflective surface as a background, so as to reflect the light back to and through the surface of the mosaic. The metallic luster is produced by forming a film of a metal or its oxide, or a compound of a metal, on or in the glass either by exposing it to vapors or gases or by direct application. It may also be produced by corroding the surface of the glass, such processes being well known to glass-manufacturers.

Figure 1:
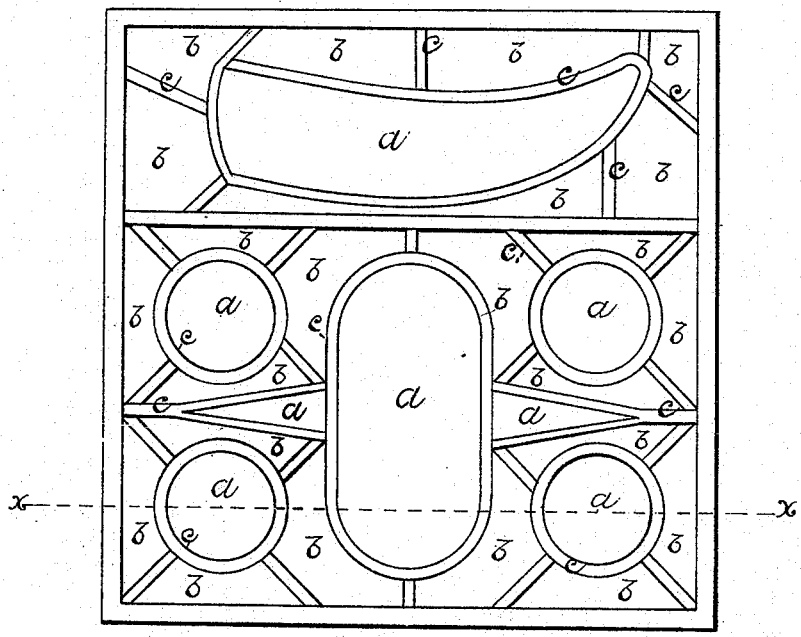
Figure 2:

In the drawings, Figure 1 represents a front view of a window containing my improvement; and Fig. 2 is a cross-section thereof, taken in the line $x\ x$ of Fig. 1.

$a\ a$, &c., are pieces of metallic-surfaced glass, and $b\ b$ are pieces of glass of various colors. $c\ c$ are leaded joints running between and joining the pieces of glass to each other.

All glass in windows is, by the application of this metallic luster, made more beautiful in effect, at night producing a highly-iridescent and more lustrous effect, and when on the surface of opalescent glass the dull whiteness and spotty appearance are removed.

With opalescent glass in exteriors there is generally too strong a contrast. This is removed by the use of the metallic-luster opalescent glass in the window or windows, as hereinbefore specified.

I claim—

A mosaic or window composed of a plurality of panes of colored glass, a number of said panes, distributed among the rest, having one of their surfaces provided with reflective coatings, substantially as described, and for the purpose set forth.

LOUIS C. TIFFANY.

Witnesses:
JAMES H. HUNTER,
ELWYN S. MAILLER.